United States Patent [19]

Beltz et al.

[11] 4,451,507
[45] May 29, 1984

[54] AUTOMATIC LIQUID DISPENSING APPARATUS FOR SPINNING SURFACE OF UNIFORM THICKNESS

[75] Inventors: John P. Beltz, Willingboro; Kenneth W. Hang, Princeton, both of N.J.

[73] Assignee: RCA Corporation, New York, N.Y.

[21] Appl. No.: 437,835

[22] Filed: Oct. 29, 1982

[51] Int. Cl.³ .............................................. B05D 3/12
[52] U.S. Cl. .................................... 427/240; 118/52; 118/320; 118/321; 264/311; 427/425
[58] Field of Search ..................... 118/320, 321, 52; 427/240, 425; 264/311

[56] References Cited

U.S. PATENT DOCUMENTS 2,487,111 11/1949 De Koning .............................. 91/45
3,198,657 8/1965 Kimball et al. ...................... 427/240
4,267,212 5/1981 Sakawaki ............................. 427/240

OTHER PUBLICATIONS

*Operation and Service Manual,* "Automatic Wafer Processing System," Veeco Macronetics, Jul. 1981, pp. 1-1-7.
News Release Headway Research, Inc., "A Moving Arm Dispenser For Large Spin Coaters," Nov. 1981, (Two Sheets).
Abandoned U.S. patent application, Ser. No. 164,346, Filed Jun. 30, 1980, abandoned on 8/16/82.

*Primary Examiner*—Michael R. Lusignan
*Assistant Examiner*—Janyce A. Bell
*Attorney, Agent, or Firm*—Birgit E. Morris; Donald S. Cohen; Joseph D. Lazar

[57] ABSTRACT

An automatic fluid dispensing apparatus for coating to a substantially uniform thickness a rotating surface, such as the surface of a semiconductor wafer, with a viscous liquid, such as a slurry of passivating glass. The wafer rotation rate is related to the radial movement of a dispensing arm to maintain a constant tangential velocity of the wafer at the radial location of the dispensing arm while a bead of the slurry is dispensed at a constant rate proportional to the tangential velocity to provide a spiral beaded coating of constant volume per square. By allowing the bead to heal during or following the dispense cycle, the viscous liquid spreads to a uniform thickness.

13 Claims, 9 Drawing Figures

AUTOMATIC LIQUID DISPENSING APPARATUS FOR SPINNING SURFACE OF UNIFORM THICKNESS

This invention relates to automatic liquid dispensing apparatus and, more particularly, to apparatus for dispensing viscous liquid-containing coating material onto a spinning surface for providing a substantially uniform coating thickness.

BACKGROUND OF THE INVENTION

The art of dispensing liquid onto a spinning surface to provide a layer of the liquid on the surface is widely used in industry. Reference is made to U.S. Pat. No. 4,267,212, for a description of a "Spin Coating Process" utilizing a photoresist dispensing nozzle moved radially over a spinning surface. Also, U.S. Pat. No. 2,487,111, issued Nov. 8, 1949, describes a coating process in which the flow rate of a viscous coating material is varied.

In semiconductor processing, a coating of a slurry is applied onto a spinning surface such as the surface of a semiconductor device by dispensing the slurry through a nozzle carried by an arm that is guided radially outwardly from a central portion to an outer peripheral portion of the device. A particular slurry useful in the processing of semiconductor materials is a frit-glass passivating mixture. See: U.S. Pat. No. 4,344,985 issued on Aug. 17, 1982 to A. M. Goodman, and M. L. Tarng, entitled Method of Passivating a Semiconductor Device with a Multi-Layer Passivant System; and the article by R. Denning and J. White, entitled "New Techniques Advance Power Semiconductor State Of The Art," RCA Technical Communications, 1979, pp. 66–72, particularly pp. 69–70, for descriptions of useful passivating slurry materials such as "SOGO." Such slurry materials can be dispensed on a semiconductor device that is substantially flat with conventional apparatus to provide a slurry coating that typically varies in thickness since the spin rate and dispenser rate, both of which are usually a constant, cause the slurry thickness to be largest in the central portion and smallest in the peripheral portions. It is known that slurry materials have essentially non-linear viscosities. See the text "Paint Flow and Pigment" by T. C. Patton, pp. 1–17 for a definition of "viscosity," and particularly for a description of shear stress on a flowing viscous liquid. It is also known that the distribution of the shear forces affecting the liquid flow are a function of the radius, causing a non-linear such as a somewhat parabolic variation in thickness profile. Moreover, if the liquid component of the slurry is highly volatile, (xylene, for example) the spin rate and ambient activity will affect the distribution of the densities of the deposited coating.

In planar structures in which there are recesses, such as that used in developing "mesa" type semiconductor devices having moats, the slurry, as it is dispensed over the spinning device, does not spread into a layer of uniform thickness, particularly in the moats. To the contrary, the moats tend to receive thicker and uneven coatings of the slurry. When the finished devices are cut or diced along the moat portions the results are very unsatisfactory in that the passivated moat rims are too thin and the bottom most portions of an etched moat are too thick. Moreover, in some structures deleterious air bubbles can be trapped in the moats underneath the glass passivant layers.

SUMMARY OF THE INVENTION

According to this invention both the speed of rotation of a spinning surface, such as a semiconductor wafer, and the radial movement of a dispensing arm are both continuously varied with a viscous liquid dispensed at a constant flow rate on the surface of the device so that the volume per square is substantially constant. Optionally, the dispensing process is interrupted so that the viscous liquid is allowed to spread into a coating layer of substantially uniform thickness over the wafer surface. Optionally, the wafer is subsequently spun at a high speed to reduce thickness of the the dispensed coating by centrifugal action. Less viscous materials may be dispensed directly to a desired uniform thickness without a "spreading" interruption.

DETAILED DESCRIPTION OF THE PREFERRED EMBODIMENTS OF THE INVENTION

In the following description of the preferred embodiments of the invention reference shall be made to the drawing in which, in brief:

The invention provides for dispensing a viscous liquid coating material, for example, a slurry, onto a spinning surface to provide a uniform thickness of the material. While the embodiment to be described utilizes a passivating slurry useful in semiconductor processes in which a planar surface of a wafer has a moat, or other recesses, the invention can be practiced using a viscous liquid useful in coating a continuous planar surface. The viscous liquid in a generic sense may be (1) a compound (such as a polyurethane polymer), (2) a mixture of a liquid (such as solution polymer formed of a liquid solvent, e.g., xylene) and (3) a polysolid (such as polystyrene). In addition, the viscous liquid may be formed of three components such as a liquid of xylene, a polymer solid such a polyisoprene and a particulate solid such as glass particles. Accordingly, the invention can be practiced to provide a coating on a material in the semiconductor art, optical disc art and other arts that utilize a spin coating process for coating viscous liquids on a substantially planar surface.

The invention is particularly advantageous for dispensing viscous liquids having a viscosity of at least three poise. However, it may be used with less viscous liquids as will be explained.

The flow of the viscous liquid is controlled through a nozzle orifice onto a surface which is rotating at a varying speed as the nozzle is moved radially over the surface at a varying rate such that the tangential velocity at surface portions of deposition is constant. Accordingly, the liquid is dispensed as a continuous spiral bead at a substantially constant volume per square. For certain viscous liquids, such as glass passivants for semiconductor devices, the liquid is allowed to "rest" to thereby spread from the beaded or partially beaded profile into a uniform thickness coating. The invention can be practiced with any automatic liquid spinning dispensing apparatus which can be modified so that the spin rate of the surface and the dispenser head radial movement rate can be controllably varied. For the purpose of illustrating one preferred mode of the invention, the description will now be directed to one for automatically dispensing liquid such as a passivating glass slurry onto a semiconductor wafer as one step in a semiconductor process.

Figure 1:
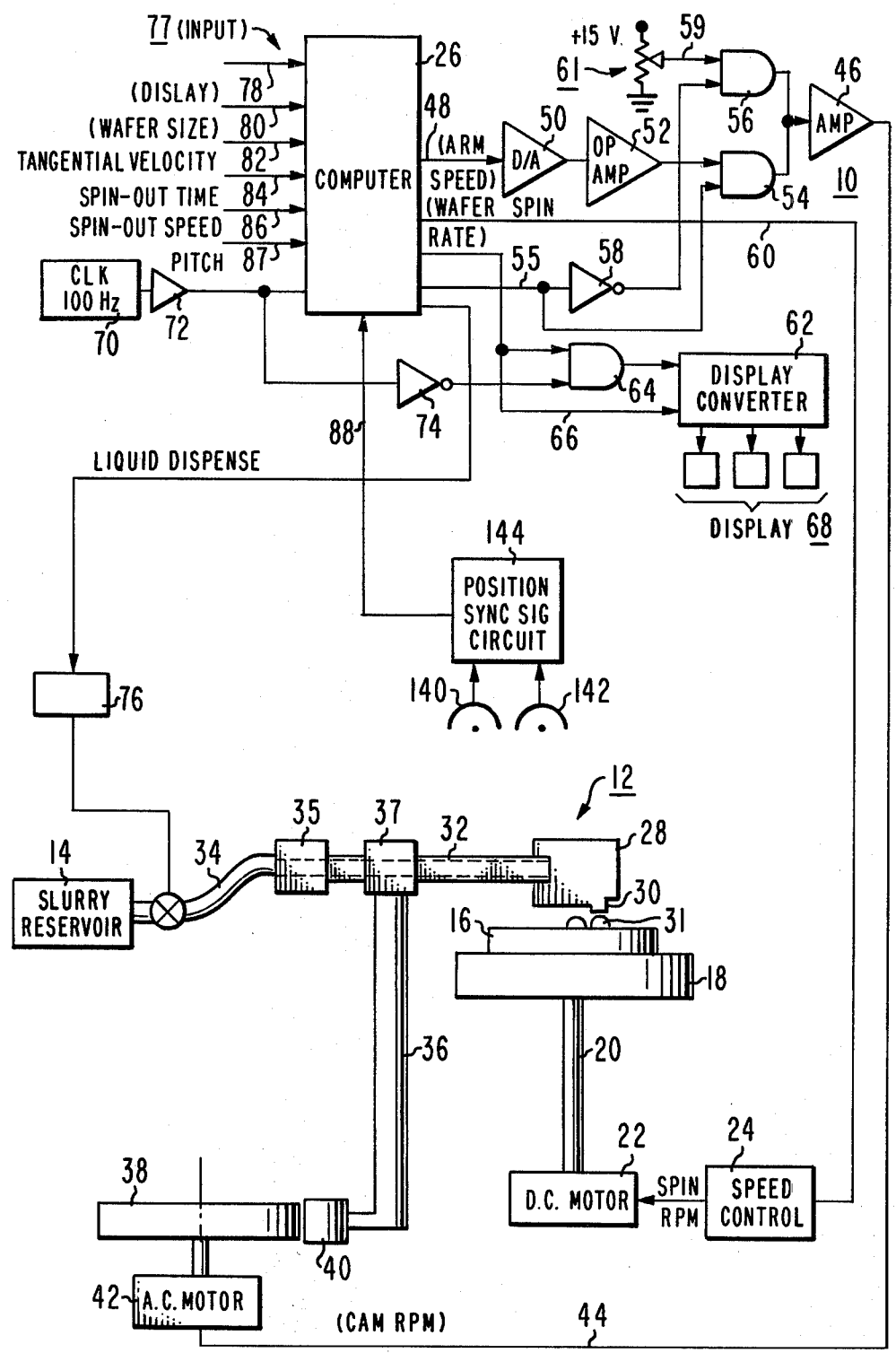
FIG. 1 is a block schematic of one embodiment of the invention.

The liquid dispensing system 10 as shown in FIG. 1 comprises a dispensing apparatus 12 for dispensing a liquid, such as a glass slurry, from a reservoir 14 onto a device 16 supported on a rotating support 18. The support 18 is rotated by a shaft 20 driven by a motor, suitably a DC motor 22 responsive to speed control electronics 24 under control of a computer 26. Computer 26 is a conventional digital computer provided with a program arranged to perform the control and calculation steps of the invention. In the embodiment being described the Intel 8085 Microprocessor, Prolog (PLS) number 858 was used. The computer was programmed according to an algorithm based on the control requirements that will be described in detail hereinafter.

Liquid dispenser apparatus 12 consists of a dispensing head 28 provided with a nozzle 30 for dispensing the fluid from reservoir 14 in the form of a continuous spiral bead 31 on the wafer or semiconductor device 16. The bead 31 will tend to flatten and thereby spread laterally into a relatively uniform layer whereby each segment of the bead 31 becomes indistinguishable from adjacent segments of the bead. The dispensing head 28 is carried by an arm 32 which is coupled to the reservoir 14 by means of a flexible hose 34 and a coupler 35. The arm 32 is moved radially in an outward direction across the surface of the wafer 16 by means of a reciprocating post 36 attached to the arm 32 by a bushing 37. The post 36 is attached to a cam follower 40 which rides on the surface of a cam 38 of predetermined shape, preferably to cause a radial movement of the head 28. The cam 38 is driven by a motor, suitably an AC motor 42, energized via bus 44 from an amplifier 46.

Amplifier 46 provides a varying operating voltage to vary the speed of motor 42 as a function of the voltage amplitude output of operational amplifier 52 during the liquid dispense periods or the voltage amplitude of potentiometer voltage 59 during the non-dispense periods.

The speed of rotation of wafer 16 by motor 22 in relation to the movement of the dispensing head 28 over the surface of the wafer in a radial direction determines the manner in which the liquid is dispensed or deposited on the surface of the device 16, for a given viscosity of the liquid.

The respective rates of rotation of the cam 38 and the wafer 16 are determined by the respective speeds of the motors 42 and 22. In general, both the rotation of the wafer 16 and the movement of the dispenser arm 28 moved radially over the surface of the wafer 16 are varied to maintain a predetermined deposition pattern of the spiral bead 31. This is achieved by control means to vary the speed of the motors 42 and 22. To that end, the computer 26 provides a signal over path 48 to a digital to analog (D/A) converter 50 which provides an amplitude varying signal to an operational amplifier 52 and thence to one input of AND gate 54 whose output is coupled to the motor amplifier 46. AND gate 54 is also gated with an enable signal via path 55 from the computer 26 in order to start the dispense cycle of the system. The same enable signal is applied to an inverter 58 whose output is connected to one input of AND gate 56, the other input of which is connected to the potentiometer voltage 59. The output of the AND gates 54 and 56 are connected to the amplifier 46. Gate 54 controls the dispenser arm speed only during the liquid dispensing mode while gate 56 controls the arm speed in the non-dispensing mode.

Computer 26 provides on control path 60 a signal for controlling the speed of the motor 22 which determines the wafer spin rate. This signal can be one calling for a fixed wafer speed, as is typical in conventional liquid dispensing systems or, it can, according to this invention, vary the wafer speed at a predetermined rate that is essentially hyperbolic as represented by curve 113 comprising portions 114/114' of FIG. 6, to be explained. Also the speed is controllable at the end of the deposition process by increasing the wafer speed from a rest position in order to spin-off excess material to reduce the thickness of the material deposited across the entire wafer. A display converter 62, energized by the output of AND gate 64 and signals on the path 66, provides conveniently, for example, a display 68 of the parameters indicative of the deposition time.

The system 10 is under control of a clock 70, at for example, 100 hertz, which provides timing inputs to the computer 26 via buffer 72 and also to the AND gate 64 via inverter 74.

The slurry provided to the dispensing head 28 from reservoir 14 is initiated via the liquid dispense signal to energize a solenoid or other similar flow control device 76.

Computer 26 is arranged to receive input data 77 as needed for each particular application, such as, the display requirements at input 78, the size of the wafer at input 80, the tangential velocity at the radial position of the nozzle 30 at input 82, the spin-out time (after the "rest" pause) at input 84, the speed of wafer rotation during the wafer spin-out at input 86 and the pitch at input 87. The computer 26 in response to these data is programmed to calculate the speed of both motor 42 and motor 22 to effect the desired coating of viscous liquid. The tangential velocity $V_t$ is determined empirically essentially as a function of dispense velocity. The parameter limiting the tangential velocity is the flow rate of the liquid through the nozzle which, in turn, is dependent on the viscosity of the liquid, the diameter of the nozzle, as well as the pressure on the liquid.

Accordingly, for a given pitch of the bead, and a given tangential velocity at the surface beneath nozzle 30 one can operate the automatic dispensing mechanism of the invention to suit any desired wafer size. The size of the nozzle orifice is fixed for each application according to the slurry to be used. The slurry flow is designed to be substantially smooth, uniform, and quickly both started-on and turned-off. In practice, the slurry can be prepared to satisfy these requirements such that the flow is predictable, and adjustable to provide a constant thickness of the as-deposited liquid as well as the final coating of the desired coating material as will be explained more fully hereinafter. To do this, the slurry must be maintained at a substantially constant flow rate through the nozzle 30. The viscosity of the slurry does affect the flow of the slurry through the nozzle 30 and also affects the form of the bead 31 that the slurry takes after leaving the nozzle during the deposition process. Moreover, the thickness of the coating on the substrate 16 developed from the bead pattern after the motor 22 has been stopped is dependent on the liquid's viscosity.

Means are provided by the system 10 to position automatically the dispenser arm 32 so that as it is moved over the center of the wafer 16 the slurry is started to be dispensed through the nozzle 31. To do this, suitable position sensing means such as photo-cell detectors 142 and 140 located, respectively, just off-center and beyond the periphery of the wafer 16 at a rest position, and a light source on the arm 32, directed to the detectors, (not shown) are used to provide the arm position signals to the computer. A positioning synchronization circuit 144 is arranged to respond to the arm positions sensed to provide control signals to the computer 26 via signal path 88. Assuming the system 10 is to start dispensing, effected by a suitable start signal, the arm 28 is positioned by conventional means at the off-center position and then moved radially through the wafer center by motor 42. At the wafer center position as the arm passes over it, as calculated by the computer (determined by sensor 142), the liquid dispense device 76 is operated to cause the slurry to flow through nozzle 30. The dispense cycle continues, as will be explained with respect to FIG. 9, until the arm 32 and the nozzle 30 are at the outer portion of the wafer 16 as pre-determined by the wafer size at input 80. At this point, the slurry flow is stopped by shutting device 76 off and the arm 32 is positioned in the rest position in preparation for the next dispensing cycle.

In operation, with the system 10 started, the wafer 16 is rotated at a starting rpm, determined in a manner to be described, typically 560 rpm. When the slurry is to be deposited the liquid dispense device 76 is energized to initiate the flow of slurry through the conduit 32 and the nozzle 30. Concurrently, the motor 42, energized via amplifier 46, rotates cam 38 and thence the cam follower 40 which rotates the post 36 and thence the dispensing arm 32 in an outward radial direction over the surface of the wafer 16, depositing the slurry in the form of a spiral bead 31. The pitch or space inbetween adjacent turns of the spiral turns is a function of the rate of rotation of the motor 22 and of the movement of the dispensing arm 28. The deposition time over a 3-inch (7.5 cm) wafer 16 is typically 6 to 8 seconds.

In conventional systems of the prior art in which the surface to be deposited with a slurry is a planar surface such as a semiconductor wafer, the problem of maintaining a uniform thickness of the slurry on the wafer surface is usually not difficult provided the viscosity of the slurry is adequate for the desired rate of deposition and pitch of the bead 31. During the deposition of the beaded slurry, a coating is developed by the combined spinning action on the bead and the spreading action of the bead. This spreading action by which the bead merges with adjacent spiral beads to form a continuous coating of substantially uniform thickness, occurs partially while the surface is spinning and continues to completion after the wafer is stopped. For surfaces having moats or wells, such as those provided in the development of mesa type transistors or moats provided for dicing IC devices, it is difficult to achieve uniform deposition of a coating of the slurry both on the planar surface as well as in the recess, whether it be a well or moat.

Figure 2:
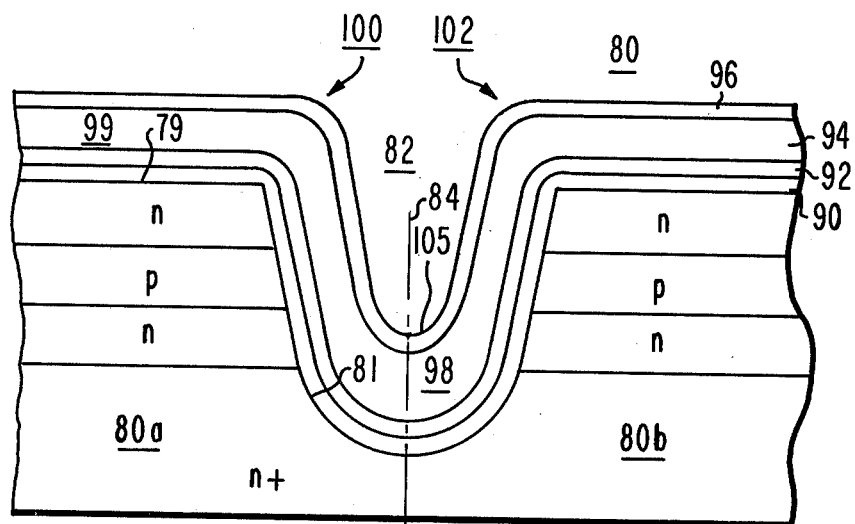
FIG. 2 is a cross section of a semiconductor wafer with moats showing a multi-layer passivant.

Reference is made to FIG. 2 illustrating an example of the passivation coating including a layer of a glass slurry in the moat 82 of a wafer 80. The wafer 80 is being formed as a semiconductor device having a plurality of semiconductor junctions which, after passivation, can be diced into separated, discrete junction devices 80a and 80b. The wafer 80 is provided with a plurality of doped layers in which a moat 82 is provided between the devices.

A center line 84 is the line of desired cutting or dicing to separate wafer portion 80a from 80b. The passivant coating comprises a first layer 90 of polycrystalline silicon (SIPOS), a second relatively thin layer 92 of silicon dioxide, a relatively thick layer 94 of frit-glass, and a relatively thin layer 96 of silicon dioxide. See the above identified U.S. Pat. No. 4,344,985 and the Denning et al. article for a description of the passivant coating known as "SOGO" and the polycrystalline ("SIPOS") layers. The frit-glass layer 94 results from a typical slurry mixture of a negative photoresist, such as Waycoat SC (manufactured by Phillip A. Hunt Chemical Corporation of Palisades Park, N.J. (45% by weight), a commercial ground glass powder (55% by weight) and a thinner such as xylene (to about 8% of the mixture) to obtain a slurry with a viscosity of about 400 centipoise (300–500 centipoise is a typical range). Nozzle 30 having an orifice of about 0.040 inch (0.016 cm) will provide a bead 31 of the slurry about 0.040 to 0.060 inch (0.024 cm) in diameter. The bead as it is deposited on the surface will be about 0.020 inch in height.

It should be understood that, in the art of depositing passivating material including photoresist components thereof, it is critically important that the coating be sufficiently thin to permit satisfactory development of the photoresist. Accordingly, this is a constraint on the desired thickness of the coating as deposited. This constraint is an addition to the flow velocity of the liquid from the dispensing orifice of the nozzle 30. In the embodiment being described, the final thickness of the layer 94 (FIG. 2) is about 1 mil of fused glass resulting from a layer deposited to a thickness of about 2 mils.

The relatively thin layers 92 and 96 of SIPOS when deposited by the conventional deposition processes, such as chemical vapor deposition (CVD), are usually thin enough so that they are deposited both on the upper surface 79 and the moat surface 81 with good thickness uniformity. However, the frit-glass layer 94, being of a more viscous slurry material, tends to have a thicker portion in the bottom of the well, as indicated at the moat portion 98, than in the horizontal surface portion 99. Such uneven deposition of the frit-glass layer 94 is highly undesirable in that it is difficult to develop the photo-glass in the moat portion 98. Furthermore, the bottom portion 105 of the passivant layers may develop cracks to allow moisture to pass into the rectifying junctions of the device and thereby provide undesirable low-resistance leakage paths. Moreover, the deposition of the slurry coating can cause entrapment of air in the form of air bubbles between the layers in the moat 82 to cause further difficulty in subsequent processing affecting the structural soundness of the passivation coating or electrical leakage.

Figure 3:
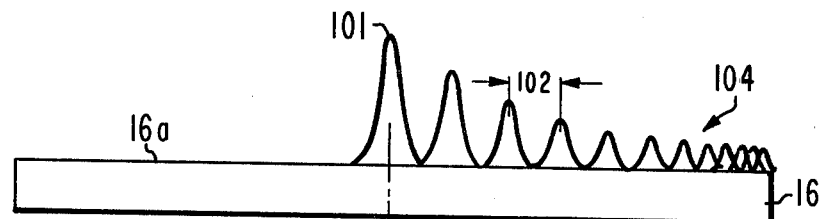
FIG. 3 is a schematic in cross section of the deposited beaded slurry as seen across a radius of the surface.
Figure 4:
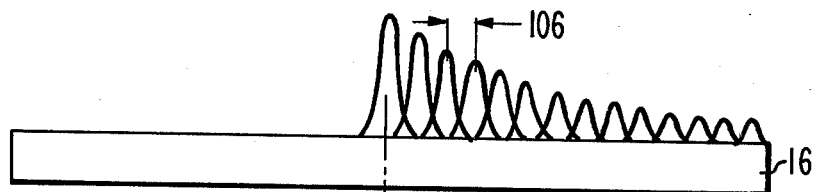
FIG. 4 is another but similar schematic showing another form of such beaded slurry.
Figure 5:
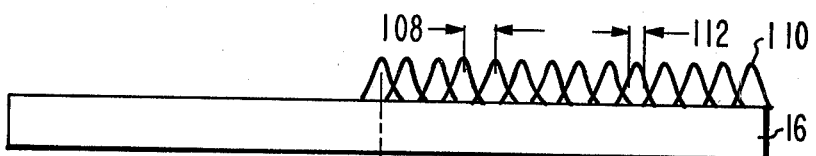
FIG. 5 is a schematic showing the desired form of the beaded slurry, that is developed according to the present invention.

For an understanding as to why spinning deposition can result in non-uniform thicknesses of a coating, such as slurry layer 94, reference is now made to FIGS. 3, 4 and 5. Each of the figures shows, in schematic form in section, bead portions of slurry as deposited as seen in cross section along a given radius of the surface of the device 16. It is assumed only for this discussion that the viscosity of the slurry is high enough to maintain the bead shape as deposited during the full time of the deposition over the surface. In practice, the beads typically of less viscous liquid actually start to spread (i.e. "heal") immediately on being deposited. In FIG. 3 the spiral bead portions at the center are large as indicated by bead 101 and then are reduced in height as the dispensing arm 32 is moved radially outwardly. In the beginning central portions, the height and pitch 102 are both relatively large compared to the height and pitch in the peripheral portions 104. This prior art bead envelope is effected by a constant speed of rotation of the surface 16a and parabolic rate of radial movement of the dispensing arm 32 discharging liquid at a constant rate. A cam (38), parabolic in shape is used to drive the arm (32). This form of bead envelope is adequate for small surfaces such as wafers on the order of 2 inches (5 cm), but as the wafer 16 is increased in diameter to 3 and 4 inches (7.5 and 10 cm) a non-uniform thickness of the coating results after the spiral bead heals.

In FIG. 4 there is illustrated a prior art bead profile effected by arrangement in which a linear cam 38 is used to drive the arm 32 with motor 22 rotating the wafer 16 at a constant speed. The linear cam causes the pitch 106 of the bead spiral to be uniform. While this bead profile is an improvement over that shown in FIG. 3 in that the pitch is uniform, it is still not adequate in the non-uniform height of the beads, i.e., greater in the central portion than in the peripheral portion. Both FIGS. 3 and 4 illustrate what may be termed a non-uniform bead profile. The non-uniform profile it should be understood does not result in a coating of uniform thickness.

As shown in FIG. 5 the beads are maintained according to this invention at a desirable uniform pitch 108 and uniform height 110. This is achieved by a uniformly deposited bead and by controlling to a constant value the tangential velocity of the wafer surface beneath the bead dispensing nozzle 30 which, in turn, is being moved radially outwardly by arm 31. By keeping both the tangential velocity and the slurry liquid bead flow rate constant and proportional to each other, the slurry liquid bead will not shear and will be maintained in a continuous and uniformly deposited spiral. The shear effect will tend to occur on the bead at the time after the bead leaves the nozzle 30 and contacts the surface.

We have discovered that the tangential velocity is preferred to be relatively low, i.e., on the order of 10 to 16 inches per second. The prior art typically operated with tangential velocities that were as great as 150 inches per second. We have discovered that the higher tangential velocities, whether constant or not, will result in non-uniform coating thickness.

In this regard, by operating the system of the embodiment being described with a tangential velocity on the order of 10–16 inches per second and the dispensed liquid flow rate on the order of 2–6 inches per second, the passivating layer 98 in the moat 82 (FIG. 2) is of the same uniform thickness as the layer 94 on the flat surface 79.

The slurry flow through nozzle 31 is at a constant flow rate, the slurry being smooth and uniformly mixed. The slurry flow through the nozzle 31, moreover, is assumed to be instantaneously controlled to be turned on and off. In practice, the slurry can be made only to approach the ideal control features. However, in the practice of this invention, good results have been achieved even with the assumption of such desirable slurry flow. Accordingly, with the surface having a constant tangential velocity at the point receiving and making contact with column of the slurry bead 31, a constant diameter bead is maintained in the deposited spiral. The cohesion of the slurry and surface material, of course, must be sufficient so that the bead clings to the surface.

In order to achieve a coating of the slurry that is of uniform thickness, the pitch of the spiral bead must be constant. Accordingly, the pitch 108 of the pattern in FIG. 5 is controlled to a constant value. To do this, both the spin rate of the surface and the rate of outwardly radial movement of the dispensing arm 32 must be controlled in a cooperative manner as will now be explained. In mathematical terms the relationships involved may be represented as follows. The tangential velocity ($V_t$) of a point on the surface of the substrate 16 is represented by:

$$V_t = R\omega \tag{1}$$

where $V_t$ is the tangential velocity in inches or centimeters per second, R is the radius in mils (or mm) of the position of the dispenser head 28 or, more particularly, the position of the nozzle 31 developing the spiral bead, and $\omega$ is the angular velocity in radians.

To maintain a uniform thickness and thus volume or weight of the coating of slurry being deposited, the product of the pitch of the spiral bead and the tangential velocity must be constant as represented by the following equation:

$$V_t \times \text{the pitch} = \text{a constant value} \tag{2}$$

where pitch is the distance from peak to peak of the spiral bead, such as indicated in FIG. 5 as the distance 108. This relationship is based on the assumption that the liquid (slurry) flow rate is constant. In a typical system, the pitch of the spiral bead is 0.075 inch (0.030 cm) and the effective width of individual beads, such as indicated between dimension 112 in FIG. 5, is 0.030 inch (0.012 cm).

In theory, the velocity or movement of the arm 28 and the angular velocity or rotation rate of the surface 16 must vary inversely as the distance from the center of the wafer 16, noting that the spiral pitch is the distance the dispensing arm moves radially outwardly in one revolution on the wafer. Accordingly, as the dispenser arm 28 is moved from the center of the wafer 16, the surface spin rate must decrease at a rate of 1/R where R is the radial position over the wafer 16 of the arm 28. This relationship is represented as a hyperbola as illustrated by curve 113 in FIG. 6. Curve 113 indicates that an infinite speed of the spinning surface at the center would be needed. Obviously, an ideal hyberbolic curve cannot be met in practice. Accordingly the speed of the surface is calculated to start at some finite value, such as 560 rpm, as shown on the ordinate of FIG. 6. Since the tangential velocity ($V_t$) is a hyberbolic function (i.e. $V_t = 1/$Radius of wafer), the starting velocity would be infinite as just stated. According to the invention, the actual starting speed of the wafer is determined by a line 118 extending from a tangent to the $V_t$ curve 113. We determined the slope of this tangent line from the inertial limitations of the motor system for motor 22. In the present embodiment the upper limit for the control the motor 22 is 10 rpm every 20 milliseconds. Thus computer 26 is programmed to calculate this speed control rate from the predetermined tangential velocity inputted to the computer via input 82. Motor 22 is thus controlled to have its speed reduced incrementally about 10 rpm every 20 milliseconds such that at about 325 mils of radius, at point 120 at the junction of curve portions 114 and 114', the motor (22) speed follows the curve portion 114' along the hyperbolic path shown. The speed of motor 22 will be controlled to effect a constant tangential velocity in accordance with curve 114' to a radius, for example, of 1500 mils corresponding to a 3 inch (7.6 cm) wafer.

Figure 6:
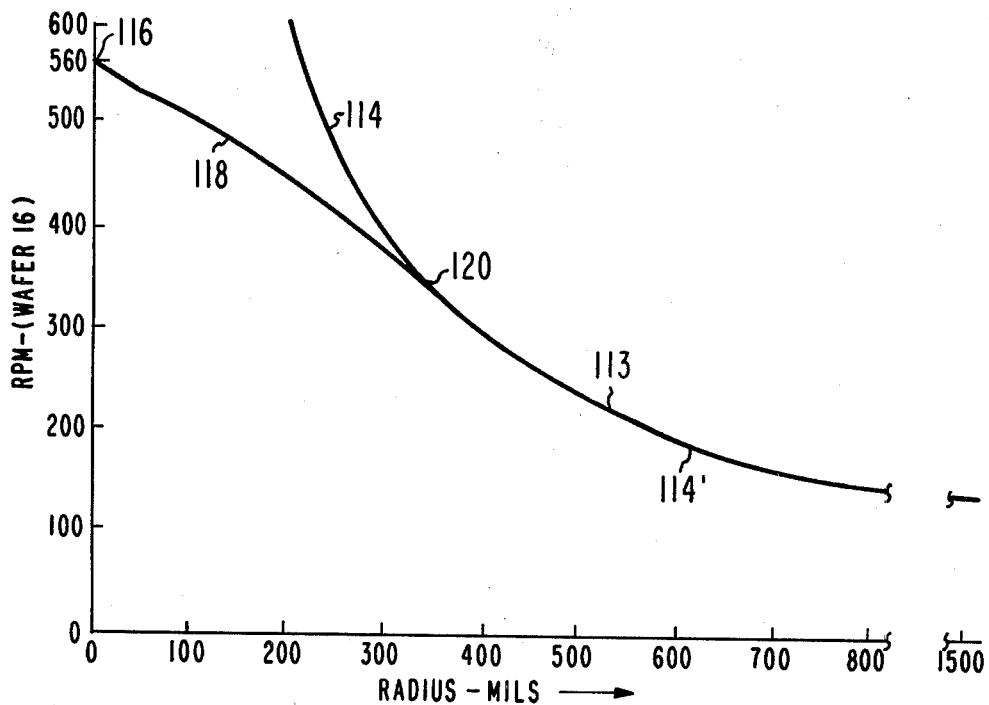
FIG. 6 is a curve plot useful in understanding the present invention illustrating the speed of rotation of the disc as a function of the radial position of the dispensing arm.

Hyperbolic curve 113 is one of a family of hyperbolic curves, each such curve being displaced from the 0—0 axes of the coordinates of FIG. 6 according to the constant tangential velocity value selected to dispense the liquid according to equation (1), described hereinabove.

In addition to the constraint discussed above by which the flow velocity from the orifice of the nozzle 30 should be substantially equal to the tangential velocity ($V_t$) of the surface to achieve uniform despensing of the liquid over the wafer surface and thereby prevent breaking-up of the bead 31, another constraint has to do with the relationship of the orifice diameter and the pitch of the bead. The following equation relates to the bead diameter (that is, the diameter d of the orifice of the nozzle 30) and the pitch (that is, the spacing, p, between the adjacent portions of the spiral bead 31) to the slurry thickness which results when the slurry has flowed and leveled. This constraint is expressed by the equation for the thickness (t):

$$t = \frac{\pi d^2}{4p} \text{ mils} \quad (3)$$

Typical values which satisfy equation (3) have a nominal thickness (t) of the slurry, after leveling, of 6 mils are as tabulated below:

| Orifice Diameter (mils) | Pitch (mil) |
|---|---|
| 10 | 12.5 |
| 20 | 50 |
| 30 | 115 |
| 40 | 200 |
| 50 | 312 |

Our experiments have shown that orifices greater than 30 mils are needed to get a reproducible flow of a high viscosity liquid, that is, a liquid of 450 centipoise (cps) or higher. The pitch spacing (p) then becomes so large for such highly viscous liquids that the slurry does not flow together by healing, resulting in an undesirably higher density of defects, such as uncoated regions, in the coating. A reduction in viscosity to the 300-350 cps range enables one to use orifices of the dispensing nozzle 30 with a pitch (p) in the 50-70 mil range. However, for lower viscosity liquids the control of the liquid is more critical to maintain a constant flow. In one example, in the practice of the invention, we assume the design parameters of a 40 mil orifice diameter nozzle 31 which dictates a pitch of 200 mils according to the table above. In operating the system with a viscous liquid of 400 cps, we discovered that the 200 mil pitch was too large to effect good leveling of the liquid after deposition due to the high viscosity of the liquid. Accordingly, we adjusted the pitch to be 75 mils. With such a pitch the leveling was found to be satisfactory. The ratio of 200 to 75 mils indicates a ratio of tangential velocity of the rotating surface to the columnar flow rate of the liquid to be 2.6. The proportionality of 2.6, it should be understood, is due primarily to the mechanical properties (e.g., viscosity, shear, etc.) of the liquid used. Other liquids may result in a different ratio.

Figure 7:
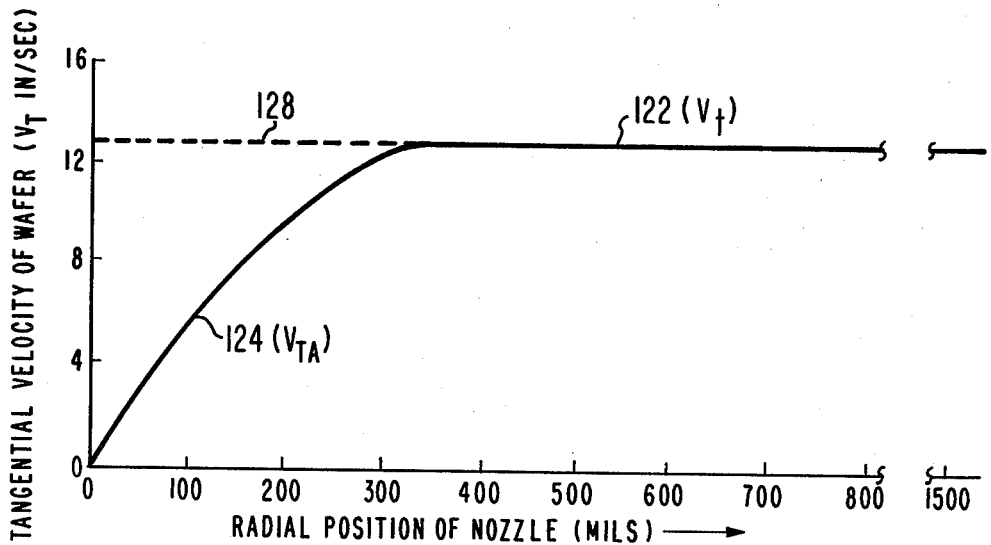
FIG. 7 is a curve plot showing the tangential velocity of the disc also as a function of the radial position of the dispensing arm.

Reference is now made to FIG. 7 which shows a plot of the tangential velocity ($V_t$) of the wafer as a function of the radius of the spinning wafer 16 as the dispensing head 28 moves outwardly from the center of the wafer. The portion 122 of the curve is substantially flat from about a radius of 300 mils and greater. This portion 122 is at substantially the predetermined tangential velocity and is thus designated $V_t$. Since the wafer 16 must be started to receive the bead from an initial value of zero radius (center), the tangential velocity $V_t$ must change from the center up to about 300 mils along the curve portion 124 ($V_{TA}$). The ideal curve represented by the dotted lines 128 is impossible to achieve, at least where R=0. In order to compensate for extra material that is deposited in the central portion during the start up portion 124, as a result of the nozzle moving over the central portion at a relatively slower rate, the pitch 108 (FIG. 5) is increased by moving the dispensing arm 30 more rapidly by changing the speed of linear cam 38.

Figure 8:
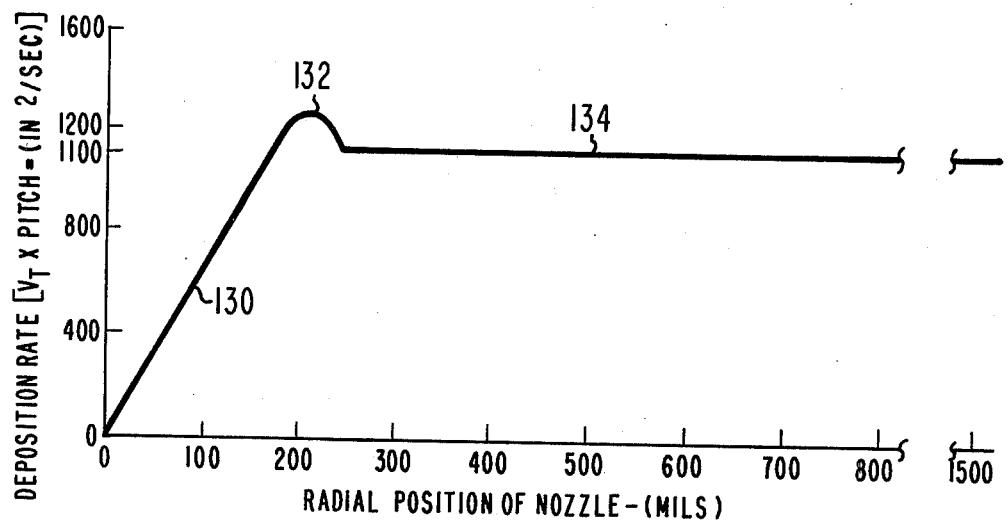
FIG. 8 is a curve plot showing the product of the velocity of the disc and the pitch of the beaded slurry as a function of the radial position of the dispenser.

Reference is now made to FIG. 8 illustrating the deposition rate and thus the area (inches$^2$/sec) of the slurry that is deposited on the wafer 16 as a function of equation (2) namely, the tangential velocity and pitch, which, according to this invention is controlled to be a constant value. Thus, since the slurry flow is a constant, equation (2) multiplied by a constant representing, volume or weight, is an indication of the constant volume of slurry material per square deposited. Curve portion 130 is substantially linear starting from the center up to about 180 mils from the center of the wafer. During this time, the product of velocity ($V_{TA}$) and pitch is increasing from the value of zero to about 1100 square inches per second. At this radial position of the wafer 16, the tangential velocity $V_{(TA)}$ is maintained such as to cause the overshoot portion 132. Thereafter velocity $V_{TA}$ becomes velocity $V_t$ and the radial velocity of the arm 12 is reduced to cause the deposition rate to follow the flat linear curve portion 134 until the extreme radial position of the wafer 16, e.g., 1500 mils is reached.

With the system 10 arranged to operate to provide a substantially constant tangential velocity and a substantially constant pitch, subject to the restrictions at the start-up as illustrated in FIG. 7, the slurry coating resulting from the spiral bead will be of substantially uniform thickness. However, the properties of the slurry used in practice are such that the spiral bead 31 cannot be made small enough to deposit a spiral that will heal into a coating of small enough thickness as is usually required. Accordingly, in order to provide a coating that is thin enough, the wafer 16 is spun briefly at a relatively high speed to spin-off the deposited material needed to reduce the coating to a desired thickness. As previously indicated, as the spiral bead 31 of the slurry is deposited on the surface, the bead starts to deform from a somewhat semicircular form into a flat form wherein the adjacent spiral turns merge. In practice, the bead is allowed to deform by this process, known as "healing," by pausing in the spinning action at the end of the dispensing cycle. The complete cycle of this process step is illustrated in FIG. 9 to which reference is now made.

Figure 9:
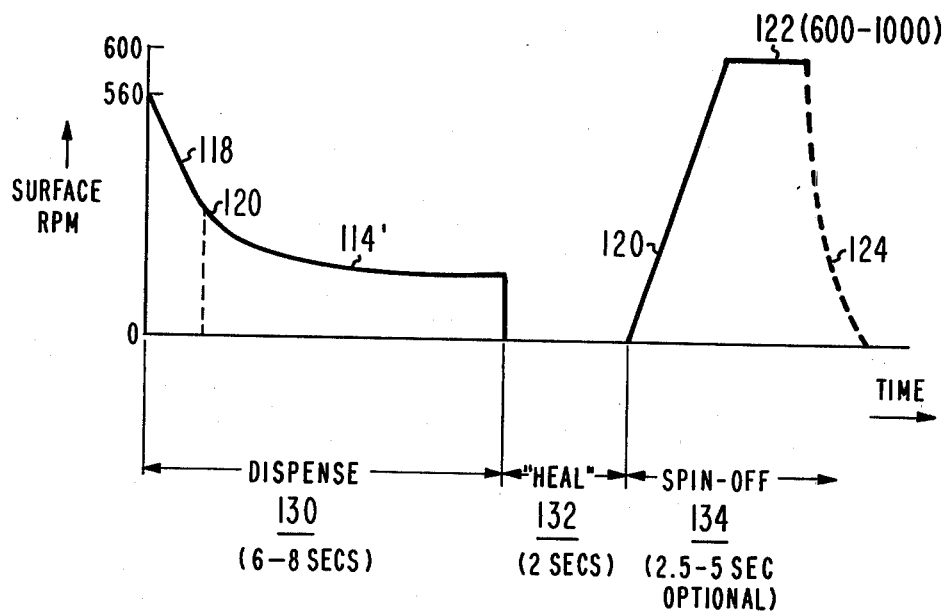
FIG. 9 is a plot of the sequential steps of dispense spinning, pausing and centrifugal spinning of one form of the invention.

FIG. 9 illustrates the relationship of the rotation speed of wafer 16 i.e. the surface RPM, as a function of time. During dispensing portion 130 (FIG. 8), the wafer 16 is spun according to linear curve portion 118 and then spun at a hyperbolic rate according to curve portion 114', as described hereinabove with respect to FIG. 6. At the end of the dispense period 130 (typically 6–8 seconds) at which the nozzle 30 is located at the outer edge of the wafer 16, there is a pause in the rotation of the wafer to allow for the heal period 132. This period is usually about 2 seconds. At the end of the 2-second heal period, the wafer 16 is spun up to a relatively high speed of at least 600 and as much as 1000 rpm as represented by curve portion 122 following the substantially linear rise in speed as indicated by portion 120. The spin-off portion 122 is held for about 2.5 to 5 seconds and then the speed is allowed to reduce to zero along curve 124. The slurry coating on wafer 16 will remain in substantially liquid form until the thinning agent (xylene, e.g.) evaporates. This evaporation period is usually about 2 minutes.

The coated wafer 16 is thereafter replaced with an uncoated wafer to repeat the coating process for layer 94. In one example, the slurry 16 has a viscosity of 400 cps, the wafer was 3 inches (7.5 cm), the orifice size was 40 mils, the tangential velocity was 16 inches per second with a pitch to 75 mils coated in 10 seconds.

With respect to the amount of spinning time needed to provide the desired coating thickness, we have found that extending the spinning time beyond the dispense period 130 is extremely undesirable. The reason for not extending the spinning time unnecessarily is that the viscosity of the deposited liquid changes due to losses of the solvent by natural evaporation as well as by air currents having an outwardly radial distribution over the spinning surface. It is for these reasons that, according to the invention, the merging of the deposited beads is effected preferably during a brief pause (heal period 132) in the deposition spin prior to the final high speed spin 134.

The maximum value of the tangential velocity ($V_t$) is limited only by the operating conditions affecting the centrifugal forces on the deposited liquid slurry bead. Although no precisely mathematically defined limit can be given, in practice one can determine the upper limit of the tangential velocity experimentally. Outwardly radial movement of the mass of the bead will be effected both by the angular rotation ($\omega$) and the adhesiveness of the bead to the surface. Excessive movement of the bead developing an asymmetrical cross-section may be one indication of the upper limit of the tangential velocity. The undesirable effect of one bead portion being forced into the subsequent bead portion is another indicia of excessive velocity.

While the preferred embodiment utilizes a linear cam 38 to rotate post 36 to thereby move the dispenser arm 32 over the device surface, post 36 can instead be rotated directly by a stepping motor receiving a computer-generated control voltage on path 44. Computer 26 would then be programmed to develop the voltage required.

While the invention is described in terms of applying a slurry passivant to a semiconductor surface, it should be understood that the invention can be practiced in any field utilizing viscous liquid spin dispensing processing. For example, the invention can be used for making an optical disc, which includes among other things, a layer of thermoplastic material such as polyurethane. A coating of polyurethane deposited by spinning, according to the teachings given hereinabove, is substantially a heated solution polymer. It is first dried after spin deposition and thereafter cooled in a conventional manner to develop a thermoplastic coating which is subsequently used as a memory storage device developed by a laser ablative process, well known in the art.

The invention may also be used in systems utilizing, for example, ultraviolet (UV) curable polymer solutions which are not necessarily volatile in nature. Such UV liquids may be used in the masking steps in semiconductor processing.

According to the invention, the apparatus 10 shown in FIG. 1 is arranged to perform the velocity control changes of both motor 42 and DC motor 22 and the dispensing of the fluid via fluid control 76 according to the particular requirements as described hereinafter. Accordingly, the computer 26 is programmed with a suitable program to achieve these various functions as a function of the various input data applied to data terminal 78–87. The algorithm for developing the program will be apparent to those skilled in the art in view of the of control requirements described hereinabove.

It should be understood the control parameter of the predetermined constant tangential velocity represented by hyperbolic curve 113 is based on the liquid to be dispensed. Accordingly, curve 113 is only one of a family of many possible curves each dependent on the application in which the invention is to be used.

What is claimed is:

1. In a system for automatically coating material on a rotating surface having means for dispensing viscous liquid containing the coating material on said surface through a dispenser nozzle supported by an arm, and means for moving said arm and said nozzle radially over said surface whereby the liquid is dispensed over said surface along a spiral path, characterized by means for varying the angular rotation velocity ($\omega$) of said surface as a function of the radial position (R) of said dispensing nozzle such that the tangential velocity ($V_t$) determined by $R \times \omega$ is substantially constant over said surface, means for varying the rate of radial movement of said nozzle to maintain a substantially constant pitch of the spiral path; and means for controlling the flow of said liquid through said nozzle at a substantially constant flow rate proportional to said tangential velocity whereby the liquid is dispensed so that the volume per square of material over said surface is constant.

2. The system of claim 1 wherein, said nozzle has an aperture of about 0.040 inch in diameter and is positioned over said surface at a height between 0.060 and 0.1 inch.

3. The system of claim 1 further including means to control the tangential velocity of said surface at a rate of constant acceleration from the center to a near center radial position to a magnitude smaller than said first-mentioned tangential velocity and thence to change the tangential velocity to increase it to said first-mentioned tangential velocity; and further including means to control simultaneously the pitch of the path to a value greater than said first-mentioned constant pitch and thence to decrease said greater pitch to said first-mentioned constant pitch as said tangential velocity is changed from the smaller to large magnitude.

4. The system of claim 1 further including means to sense the position of said nozzle over said surface to provide position signals indicative of the position of said nozzle relative to the center of said surface and the periphery of said surface and means responsive to said position signals to control the flow of said liquid, and the rotation speed of said surface with the radial movement of said nozzle.

5. The system according to claim 4 further including means to interrupt the rotation of said surface for a predetermined time to allow said material to heal on said surface.

6. The system according to claim 5 further including means to restart the rotation of said surface after said healing to an angular velocity greater than the angular velocity at the time of interrupt for a predetermined time period to spin off excessive material from said surface to provide thereby a coating of predetermined reduced thickness.

7. The system according to claim 1 further including a digital computer responsive to said position signals to control said tangential velocity, said radial movement of said nozzle and the flow of said liquid to provide a coating of material of substantially constant volume per square.

8. A method for automatically coating a material on a rotating surface including the step of dispensing a viscous liquid containing the coating material through a nozzle moved radially over the surface whereby the liquid is dispensed over the surface along a spiral path, characterized by the steps of:

varying the angular rotation velocity ($\omega$) of said surface as a function of the radial position (R) of said dispensing nozzle such that the tangential velocity ($V_t$)=R×($\omega$) is substantially constant over said surface, varying the rate of radial movement of said nozzle to maintain a substantially constant pitch of the spiral path; and controlling the flow of liquid through said nozzle to a substantially constant value, whereby the liquid is dispensed so that the volume per square of material over said surface is constant.

9. The method according to claim 8 wherein said liquid is a passivation slurry including sufficient vaporizing thinner to provide a slurry viscosity in the range of 300 to 500 centipoise, said nozzle having an aperture of about 0.040 inch in diameter and positioned over said surface at a height between 0.060 and 0.1 inch.

10. The method according to claim 8 further characterized by the step of controlling the tangential velocity of said surface at a constant rate from the center to a near center radial position to a magnitude smaller than said first-mentioned tangential velocity and thence to increase the tangential velocity to said first-mentioned tangential velocity; and the further step of controlling simultaneously the pitch of the spiral path to a value greater than said first-mentioned constant pitch and finally decreasing said pitch to said first-mentioned pitch as said tangential velocity is changed from the smaller to larger magnitude.

11. The method according to claim 8 further characterized by the step of sensing the position of said nozzle over said surface to provide position signals indicative of the position of said nozzle relative to the center of said surface and controlling in response to said position signals the flow of said liquid, the rotation speed of said surface with the radial movement of said nozzle.

12. The method according to claim 11 further characterized by the step of interrupting the rotation of said surface at said peripheral position for a predetermined time to allow said material to heal on said surface.

13. The method according to claim 12 further characterized by the step of restarting the rotation of said surface after said healing time to a tangential velocity greater than said first-mentioned tangential velocity for a predetermined time period to spin-off excessive material from said surface to provide thereby a coating of predetermined reduced thickness.

* * * * *